US007523341B2

(12) United States Patent
Hufferd et al.

(10) Patent No.: US 7,523,341 B2
(45) Date of Patent: Apr. 21, 2009

(54) METHODS, APPARATUS AND COMPUTER PROGRAMS FOR RECOVERY FROM FAILURES IN A COMPUTING ENVIRONMENT

(75) Inventors: John Hufferd, San Jose, CA (US); Kalman Z. Meth, Netanya (IL); Julian Satran, Atlit (IL)

(73) Assignee: International Business Machines Corporation, Armonk, NY (US)

( * ) Notice: Subject to any disclaimer, the term of this patent is extended or adjusted under 35 U.S.C. 154(b) by 456 days.

(21) Appl. No.: 10/844,796

(22) Filed: May 13, 2004

(65) Prior Publication Data
US 2005/0268145 A1 Dec. 1, 2005

(51) Int. Cl.
*G06F 11/00* (2006.01)
(52) U.S. Cl. .............................. 714/4; 714/6; 709/223; 709/224
(58) Field of Classification Search ...................... 714/4
See application file for complete search history.

(56) References Cited

U.S. PATENT DOCUMENTS

| | | | | |
|---|---|---|---|---|
| 6,185,695 | B1* | 2/2001 | Murphy et al. | 714/4 |
| 6,915,354 | B1* | 7/2005 | Ozdemir et al. | 710/5 |
| 7,039,827 | B2* | 5/2006 | Meyer et al. | 714/4 |
| 7,085,883 | B1* | 8/2006 | Dalgic et al. | 711/114 |
| 7,089,281 | B1* | 8/2006 | Kazemi et al. | 709/203 |
| 2002/0166002 | A1* | 11/2002 | Milner et al. | 710/8 |
| 2003/0014526 | A1* | 1/2003 | Pullara et al. | 709/227 |
| 2003/0126315 | A1* | 7/2003 | Tan et al. | 710/1 |
| 2005/0138466 | A1* | 6/2005 | Spry | 714/6 |
| 2005/0157730 | A1* | 7/2005 | Grant et al. | 370/401 |
| 2005/0273645 | A1* | 12/2005 | Satran et al. | 714/4 |

OTHER PUBLICATIONS

"iSCSI: The Universal Storage Connection", John L Hufferd, Addision Wesley, 2003, pp. 176,177, and 179.*

* cited by examiner

*Primary Examiner*—Emerson C Puente

(57) ABSTRACT

Provided are methods, apparatus and computer programs for recovery from failures affecting a server in a data processing environment in which a set of servers controls a client's access to a set of resource instances. Independent of any server failure, the client or a gateway is provided with an identification of both a primary server for accessing the resource and at least one secondary server for use as a backup server for accessing the same resource instance (for example, the same physical storage disk). The client or gateway connects to the primary server to perform resource access operations. Following a failure that affects availability of the primary server, the client or gateway connects to the previously identified secondary server to access the same resource instance. Provision of the identification of at least one backup secondary server (without requiring the 'trigger' of a failure) avoids the need to discover a new server as part of the recovery operation following a failure. Release of existing reservations using a reset operation, and re-reservation by the original initiator via a backup server, deals with any dangling reservations.

15 Claims, 4 Drawing Sheets

METHODS, APPARATUS AND COMPUTER PROGRAMS FOR RECOVERY FROM FAILURES IN A COMPUTING ENVIRONMENT

FIELD OF INVENTION

The present invention relates to methods, apparatus and computer programs for recovery from server failures affecting server availability in a computing environment.

BACKGROUND

Fault tolerance, including the ability to recover from failures, is essential to the efficient operation of many computer systems and system components. 'Failover' recovery is a backup operational mode in which the functions of a system component (such as a processor, storage device, server or database) are automatically taken over by secondary system components when the primary component suffers a failure or becomes unavailable for other reasons.

In the past, when all stored data was connected to individual server computers in very basic point-to-point configurations, any failure of a single server could make data access impossible until the server recovered. More recently, developments such as storage area networks (SANs) have enabled any-to-any connections between servers and data storage systems. A failed path between a server and a storage system may result from the failure of any component in the path, but redundant components and multiple connection paths are typically provided within a storage network to ensure that connectivity remains possible when one or more components or paths fail. Automatic failover recovery enables normal functions to be maintained despite the inevitability of failures affecting components of a computer system.

A possible failover recovery scheme for dealing with server failures is to employ server-redundancy, with a secondary server having full access to state information of a primary server to enable the secondary server to continue processing of commands when the primary server fails. The secondary server is made aware of a communication-initiator's possible reservations of resources that were initially accessible via the primary server. There is a significant overhead associated with maintaining detailed server state information at other servers.

A failover recovery solution could entail a secondary server using an IP address take-over mechanism, so that all future commands targeted at the address of a failed server will be received and handled by the secondary server. Instead of maintaining state information for the primary server at the secondary server, any pending command that was not completed can be allowed to timeout (in some environments). Such a solution would typically require a status-checking mechanism such as a 'heartbeat' mechanism for the secondary server to detect a failure of the primary server—in addition to the overhead of IP address takeover. As well as these overheads, such a solution would not automatically deal with dangling reservations (described below) and so reservation information would have to be saved persistently by the primary server to enable that information to be retrieved during recovery if the primary server fails. In a simple implementation, each server could have a backup server performing heartbeat checks and able to perform IP address takeover operations, but doubling the number of servers for redundancy is an expensive option.

A dangling reservation exists when a communication-initiator client has reserved a resource (such as a storage device) for exclusive use, but the initiator is no longer able to access the resource due to failure of the server that executed the reservation. The initiator client is unable to cancel the reservation and this could render the reserved resource unusable by any clients—unless another server has some mechanism for taking over management of existing reservations.

SUMMARY

A first embodiment of the invention provides a failover recovery method for a computing environment in which a set of servers controls clients' access to a set of resources. A service requestor entity is provided with an identification of a primary server within the set of peer servers for accessing the resource. Independent of any failure of the primary server, the service requestor is also provided with an identification of at least one secondary server for use as a backup server for accessing the same resource instance—such as the same physical storage disk. The service requestor connects to the primary server to perform resource access operations. Following a failure that affects the availability of the primary server, the service requestor is able to connect to the previously identified secondary server to access the same resource instance. The service requestor and secondary server then continue resource access operations.

In this way, provision of a small element of configuration information to a service requestor entity—identifying at least one backup secondary server without requiring the 'trigger' of a failure—can greatly simplify recovery processing. Furthermore, such a solution does not require replication between servers of the set of the resources, or replication of state information for a specific server or resource, and avoids the need for IP address take-over. This differentiates the present invention from existing DNS servers or Web servers that rely on replication of information between a primary and secondary server.

The 'service requestor entity' in this context may be any networked data processing apparatus or data processing entity that requests services of a service-providing 'server' apparatus or entity. The service requestor may be a request-initiating client device or an intermediate gateway between the client device and the set of servers. The server manages resource access on behalf of the client. The words 'client' and 'server' do not imply any limitations as to the type of data processing apparatus or installed programs. The 'primary server' in this context is the server that initially provides access to the required resource. Network configuration information may explicitly define the primary server as the default server for requests for access to a given resource, but the term 'primary server' also includes one of a set of servers that is selected at run-time. The set of servers that are capable of providing access to the resource are referred to below as 'peer servers'—referring to their common ability to handle resource access operations ('peer' in this context does not imply a limitation to a set of identical servers). A 'secondary server' is any server that is capable of handling the resource access functions of the primary server if the primary server becomes unavailable.

A minimal number of additional servers identified as backup secondary servers can provide redundancy for many primary servers. Also, a set of peer servers can be provided in which any one of the peer servers is configurable to take over data access requests for a failed server.

The invention may be applied to failover recovery of iSCSI servers, where a primary target server provides access to a storage device for an iSCSI client (initiator) within a storage area network (SAN). If the primary server fails, the failure is identified (perhaps implicitly by a timeout) by the iSCSI initiator or an iSCSI gateway, and the initiator or gateway then connects to the specified backup target server to access the same storage device. The initiator or gateway directs all future traffic (that would have been sent via the failed server) to the backup server. The invention may also be applied to other networks, such as FibreChannel networks.

In some embodiments, including iSCSI and non-iSCSI implementations, a communication-initiating client connects to one of a set of servers that each provides access to the same services and resources. A primary and a backup server are both specified to the client. The client detects that its primary server has not responded and then connects to the previously identified backup server. The communication initiator is able to use the specified secondary server to replace the primary server to handle resource access operations—without requiring complex IP address takeover or duplication of required resources and without the overhead of sharing detailed state information between servers. Furthermore, the invention can be implemented without periodic heartbeat operations. For example, either a command timeout or a lack of response to a verification utility or command (NOP, ping or similar) may be used as an indicator that a primary target server may have failed. The initiator responds to the command timeout or lack of response by connecting to the specified backup secondary server, and directs all future traffic to the backup server.

Dangling reservations may be handled as follows. In one embodiment, information regarding exclusive reservation of a shared resource may be saved persistently by the primary server—so that the information can be retrieved upon recovery. In another embodiment, the communication initiating client or an intermediate gateway server detects a failure of a primary server, connects to a secondary server, and then the initiating client or gateway resets the status information of any resources reserved for the client via the primary server. This reset operation cancels all reservations obtained for the reset resources, without the need to access a primary server's persistently stored reservations information. The initiator then attempts to reserve the reset resources again via the backup server—aiming to minimize any delay between the reset and the new reservation, to minimize the potential for a different initiator to request reservation of the resource. As well as avoiding the need for access to persistent reservations information at a primary target server, this latter approach also does not require a primary and secondary server to share reservation information or other state information.

A method as described above may be implemented in computer software, using program code instructions to control the performance of operations of a data processing apparatus. Such computer programs may be made commercially available as program products comprising program code recorded on a recording medium, or may be available for download via a data transfer medium.

Other embodiments of the invention provide a communication-initiator client computer program, and a client data processing apparatus comprising a data processing unit, a data storage unit and a communication initiating client program. The communication initiator is configured with an identification of both a primary server and a backup secondary server, which are each capable of providing access to the same instance of a required resource. The communication initiator is configured to establish a connection to the primary server, and to obtain a reservation of the required resource via the primary server to perform resource access operations. The communication initiator may comprise a configuration manager, for storing an identifier of both a primary server and a backup secondary server for accessing a required resource instance, and a service requestor for requesting services of the servers. The communication initiator responds to a failure affecting the primary server by establishing a connection to the previously identified backup secondary server. The initiator requests a reset of the reserved resource, thereby releasing the reservation obtained via the primary server, and then obtains a new reservation of the required resource via the backup secondary server. The initiator can then access the required resource via the backup secondary server.

Other embodiments of the invention implement the recovery method at an intermediate gateway server between the communication-initiating client and the set of access-providing servers.

Another embodiment of the invention provides a data processing apparatus comprising a data processing unit, a data storage unit, and a resource access controller. The resource access controller is configured to respond to a notification of a failure affecting a primary access controller by resetting reserved resources identified by a service-requesting client or an intermediate gateway server, thereby releasing resource reservations obtained for the service-requesting client via the primary access controller. The resource access controller then obtains a new reservation of required resources on behalf of the client. The resource access controller and primary access controller may be peer storage controllers for managing access to a specific set of storage devices.

BRIEF DESCRIPTION OF DRAWINGS

One or more embodiments of the invention are described below in more detail, by way of example, with reference to the accompanying drawings in which.

DETAILED DESCRIPTION OF EMBODIMENTS

Figure 1:
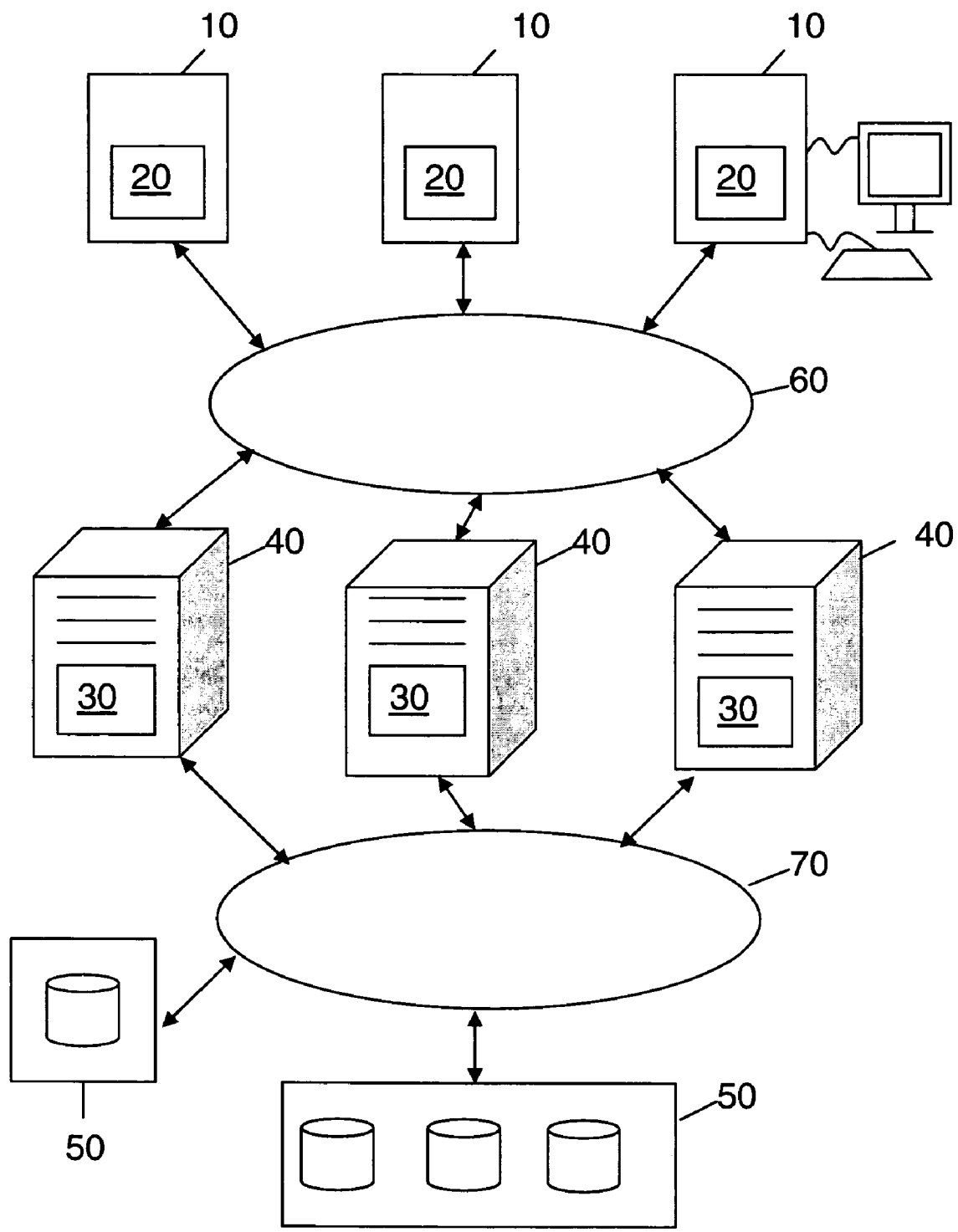
FIG. 1 is a schematic representation of a network in which a set of servers controls client access to resources within a storage network.

A storage area network (SAN) is a special purpose network that interconnects data storage devices with associated data servers, providing high-speed data access for a wider network of users. SANs typically form part of the overall computing resources of an organization, with the servers and storage devices of the SAN often being clustered in close proximity to other computing resources such as mainframe computers. However, a SAN may also include components at remote locations—for example, using wide area network carrier technologies to access backup storage. SANs are known to support disk mirroring, backup and restore, archival and retrieval of archived data, and the sharing of data among different servers in a network.

A storage area network (SAN) may use one or a plurality of different communication technologies, such as iSCSI or Fibre Channel technology. Fibre Channel is a technology for transmitting data between computer devices, currently at data rates above 1 Gbps, and is especially useful for connecting server computers to shared storage devices and for interconnecting storage controllers and drives. Fibre Channel over IP (FCIP)

translates Fibre Channel control codes and data into IP packets for transmission between geographically separated Fibre Channel SANs.

The Internet Small Computer System Interface (iSCSI) protocol is an alternative IP-based storage networking standard for linking data storage facilities—such as within a SAN or linking SANs across a Wide Area Network (WAN). iSCSI provides important support for development of SAN solutions by increasing the distance capabilities and price-performance of storage data transmission. The SCSI interfaces enable services to be requested from I/O devices including hard drives, tape drives, DVD and CD drives, printers and scanners. By carrying SCSI commands (in SCSI-defined Command Descriptor Blocks) and data over IP networks, iSCSI is used to facilitate data transfers over intranets and to manage storage over large distances. iSCSI is described in detail in "iSCSI: The Universal Storage Connection", John L. Hufferd, Addison Wesley, 2003 and in the IETF IP Storage Working Group's Internet Draft draft-ietf-ips-iscsi-20.txt, "iSCSI", 19 Jan. 2003, Julian Satran et al (referred to herein as "the iSCSI specification").

The following is a brief summary of how iSCSI works. When an end user or application at an iSCSI initiator node (the iSCSI client) sends an I/O request, the operating system generates SCSI commands with corresponding data (in a Write operation, but not in a Read operation for example). The generated commands and data are encapsulated—an iSCSI packet header is added—followed by encryption if necessary. The resulting IP packets are transmitted over an IP connection (for example over Ethernet, or some other physical transport) to an iSCSI target node (iSCSI server). When a packet is received, encrypted packets are decrypted and then disassembled—separating the SCSI commands from the data. The SCSI commands are sent to a target SCSI storage device. Responses to the original request are returned to the initiator by the iSCSI target, also using the iSCSI protocol.

Described below is an example implementation of the present invention in a low-overhead failover recovery solution for iSCSI, which enables efficient take-over of the functions of a failed server and addresses the problem of how to handle a failed-server's dangling reservations.

An iSCSI initiator (client) may be a standard network-connected computer, except that an iSCSI client uses the iSCSI protocol to access storage devices that are located across a TCP network. The iSCSI client comprises a processor, memory, communication ports, installed programs and may or may not have disks or other storage devices physically connected to it.

The iSCSI client comprises a service requestor accessing required iSCSI storage devices over the TCP network. The iSCSI targets (servers) manage the iSCSI client's remote storage devices. These storage devices are typically connected to the iSCSI targets, and are accessible only through the iSCSI targets. An iSCSI target can be implemented in various ways, but a typical iSCSI target node has the standard components of other computers (one or more processors, system memory, communication ports, installed program code, etc). The iSCSI target may also have special hardware particular to storage controllers and other similar devices. Both the initiator and the target may use special hardware such as a Host Bus Adaptor (HBA) to interface the I/O over the physical transport. The HBA typically performs the protocol specific (iSCSI or FCP) functions, and the HBA typically consists of an embedded processor, on-card memory, ports, and possibly some protocol-specific hardware.

FIG. 1 shows an example network in which a number of client data processing systems 10 include iSCSI initiator nodes 20 (referred to hereafter as "initiators" or "communication initiators"). The iSCSI initiators at the clients connect to iSCSI target nodes 30 (hereafter "targets" or "servers") at one of a number of iSCSI server computers 40 to access a storage device 50. The iSCSI targets may include intermediary iSCSI gateway servers and iSCSI storage controllers. The targets 30 and the initiators 20 are connected via a TCP/IP network 60, and the iSCSI targets are TCP/IP communication endpoints that understand iSCSI packets. There may be many physical storage devices 50 managed by the same iSCSI target 30, and a number of targets 30 may be configured to access the same storage devices 50 via a storage area network (SAN) 70. The SAN may include, for example, a backend FibreChannel storage network or Loop, or a common SCSI bus. The SAN 70 may include a number of interconnected switches providing redundant paths between the iSCSI targets 30 and the storage devices 50. Although there may be one or more iSCSI nodes at a client or server system, FIG. 1 and the following description assumes a one-to-one correspondence for simplicity.

Each target 30 is configured with a globally unique identifier, and may be configured to recognize the names and IP addresses of each of this target server's set of peer target servers. The set of peer target servers comprises the target servers that are capable of handling data access requests for a specific set of data storage devices. Each new communication session between an initiator and a target server is assigned a unique Session Identifier (SSID) which is stored at the initiator and the target server. Each initiator explicitly specifies a unique initiator session ID (ISID) at session establishment, and the SSID is created using this initiator session ID (ISID) and a target ID that is provided by the target during session establishment.

The iSCSI specification defines two different types of session that may be established between an ISCSI initiator and an iSCSI target server. The first type is a Normal-type communication session, which may include one or more TCP/IP connections for data transfer between the initiator and target server. The second type of session is a Discovery-type session, which is used by an initiator for locating available target servers within a SAN. In a Discovery session, a single TCP/IP connection is established between the initiator and a "discovery target", and the session is specified to be a Discovery session in the session-establishing login request. The initiator issues a SendTargets command to obtain from the discovery target a list of other targets to which the initiator may connect. After receiving the list of other targets, the Discovery session is terminated. The initiator can then open Normal sessions with any of the discovered targets.

Figure 2:
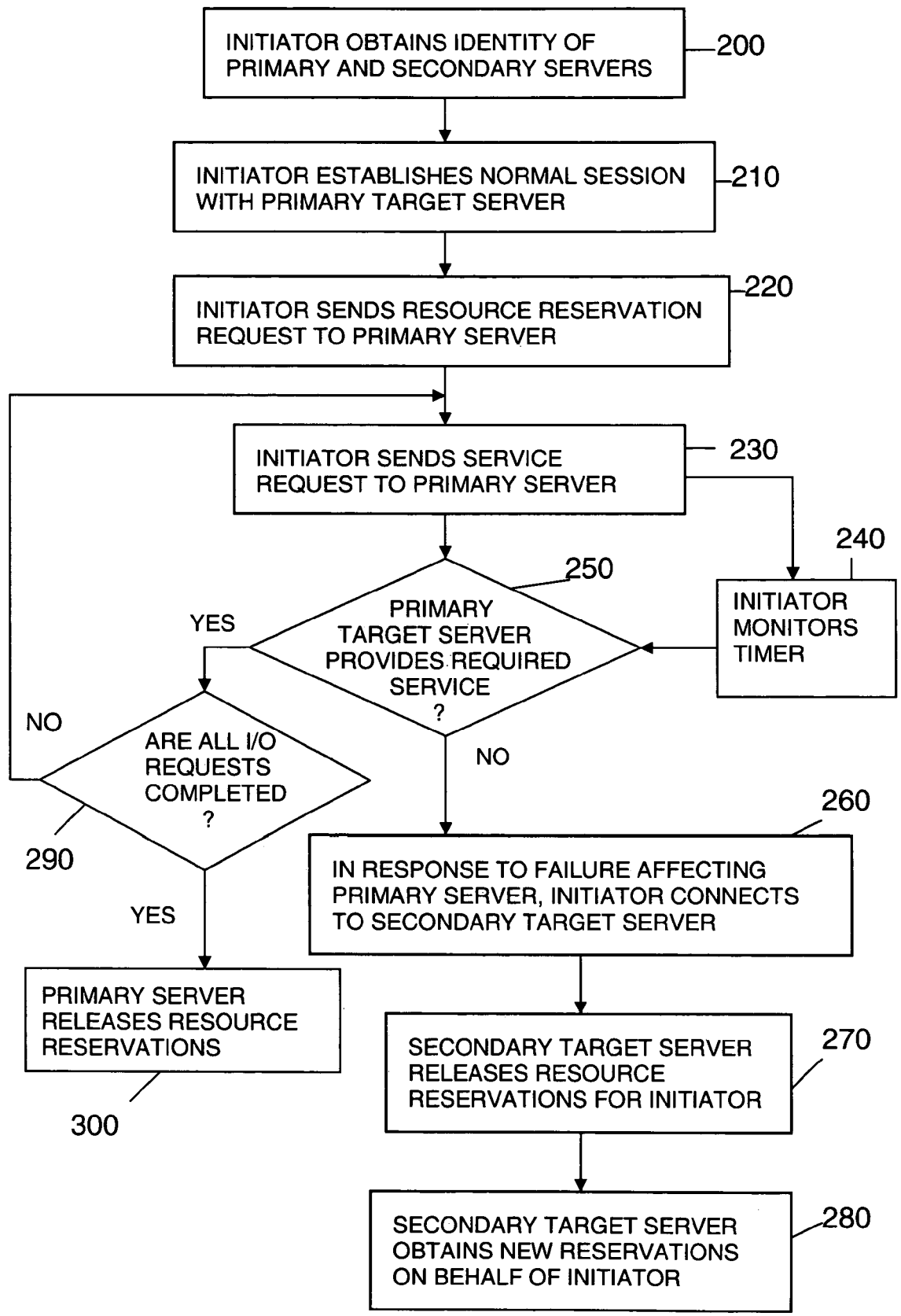
FIG. 2 shows the steps of a failover recovery method according to an embodiment of the invention.
Figure 3:
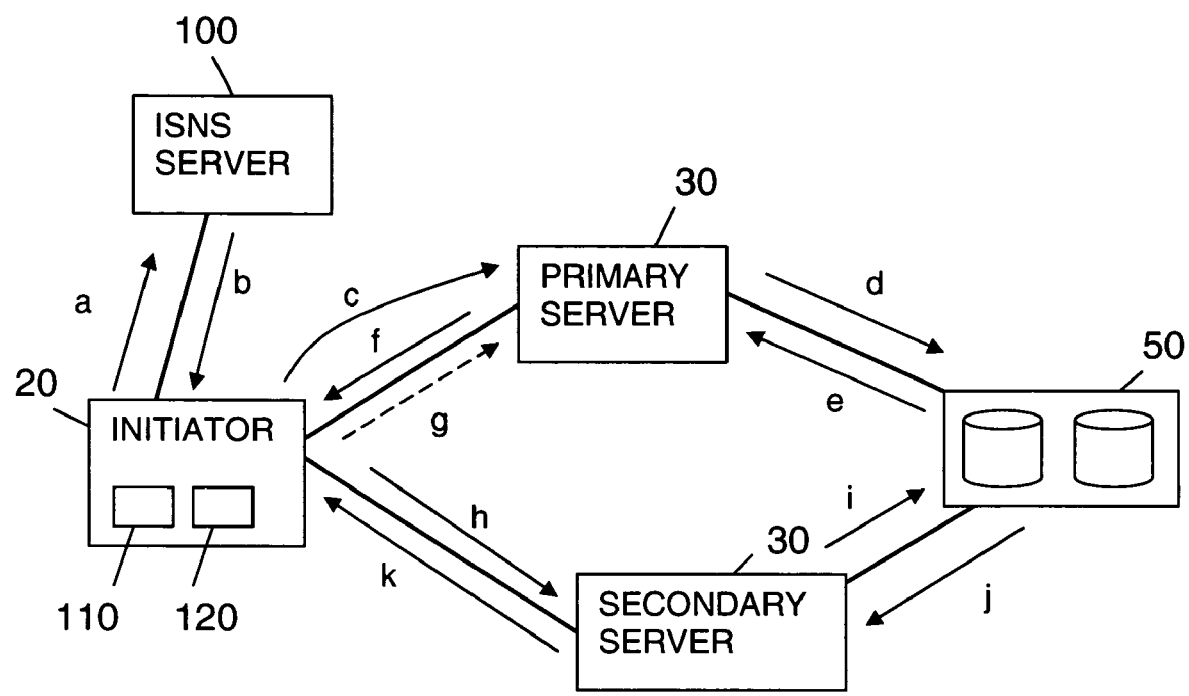
FIG. 3 shows a flow of communications within a network according to an embodiment of the invention.

A sequence of steps of a failover recovery method, according to an example embodiment of the invention, is described below with reference to FIG. 2 and FIG. 3.

The target servers are not required to maintain detailed state information for other target servers. In some embodiments, an iSCSI initiator may be statically configured (for example manually by an administrator) to use a respective primary server, identified by its predefined globally unique identifier, for accessing a pool of iSCSI storage devices. In this case, the static configuration information may include identification of a backup server for accessing the same set of resource instances (physical disks) in case the primary server fails. Alternatively, a primary server and a secondary server are both identified dynamically, by querying (step 200 in FIG. 2) an iSNS name server or some other centralized registry with which target servers register. The step of querying an iSNS server 100 is represented as step a in FIG. 3, and a response from an iSNS server is represented as step b in FIG.

3. The identifications 110, 120 of a primary server and a secondary server are stored 200 under the control of a configuration manager of the initiator 20.

In another alternative, a multicast Service Location Protocol (SLP) request may be used to identify the primary and secondary server. Each target server of a particular set is be configured to listen on a specialized communication port for SLP or other discovery requests, and then the initiator sends a multicast message onto the network asking all servers listening on the specialized communication port to respond.

The information available from known discovery mechanisms typically includes the names of the available targets and their addresses. In iSCSI, the initiator also requires the iSCSI name of the primary and secondary servers. Several gateway targets may respond to the same target name, indicating that they handle the same set of storage devices, while being differentiated by their IP addresses. The initiator, in this example, may be configured with an identification of multiple paths to each of a set of storage devices to allow for path failures.

In general, several discovery mechanisms are known to help locate servers of various services within computer networking environments, and some known mechanisms involve identifying a discovery server which is then used to identify a specific server to manage data access operations. Whichever mechanism is used for locating a primary server, the present invention also provides an identification of a backup server— typically but not necessarily via the same locating mechanism—without waiting for a failure of the primary server. Since an identification of a backup server has been obtained and stored by the initiator, failover recovery is achievable without having to search for a replacement server after a failure occurs, and without the servers being required to maintain state information for other servers. If multiple servers are identified as potential primary and secondary servers, a selection can be made using any one of a number of known techniques (techniques such as 'first responder', 'random choice among responders', 'round-robin', 'shortest path').

A network in which the invention is implemented may include multiple iSCSI targets which each have access to the same set of storage devices. For example, the targets may be attached to a backend FibreChannel SAN or to a common SCSI bus. In one example embodiment, each client is configured to initially connect to this common pool of storage devices via a specific target server. In another embodiment, each client uses a discovery mechanism to obtain a list of potential targets and then makes a selection of both a primary server and secondary (backup) server from this list.

The initiator connects 210 to one of the targets in the list of targets (referred to below as the primary target server) in order to access its storage devices. The client system of the initiator uses standard operating-system-dependent system calls to open a TCP connection (and in UNIX-based systems, the socket( ) system call can be used).

For SCSI environments, the initiator issues 220 a PersistentReserveOut( ) command with Reserve service action. Such a SCSI command is encapsulated in a SCSI Command Descriptor Block (CDB) and sent to the primary target server. When using iSCSI, the CDB is encapsulated in an iSCSI Protocol Data Unit (PDU) before being sent to the target. The target receives the command and, if the resource (disk or other device) is available, reserves the resource's use for the initiator. Then, other initiators may not use the reserved resource until the initiator issues a PersistentReserveOut( ) command with Release service action for the specified resource, instructing the current server to release 300 the relevant reservation. The reservation is persistent in the sense that the reservation remains in place if the reserving server fails.

The initiator requests 230 services of the primary target server 30 to obtain access to the required resource instance. This is step c in FIG. 3. During successful communication, the primary server manages performance of the requested I/O operation and sending of responses to the initiator (steps d,e,f in FIG. 3). The communication session may continue and the resource reservation may be held until all of a set of related I/O operations have been performed for the resource (as determined at steps 250, 290 of FIG. 2). If successfully completed, the resource reservation is released 300.

The initiator monitors 240 a time delay from the sending of an iSCSI request to the primary target server. If no response is received within a predefined time period, the initiator determines 250 that the primary server may have failed. The tracking of responses may use one of a number of different well-known mechanisms, according to application and system requirements. For example, a typical implementation involves maintaining a data structure containing an identifier of all messages that are awaiting responses. Many applications implement a message tracking mechanism, and many applications also have contingency operations to perform in the event that responses are not received within a certain time period. This known detection approach may be applied to the present invention. A mechanism used in many SCSI subsystems is to set an internal timer with an alert action to be performed in case a response is not received within a time period after the message is sent. If a response (f) to a request message (c) arrives within the set time period, the timer-controlled contingency action is cancelled; but if a request (g) does not receive a response within the defined time period, the contingency action is performed.

In some embodiments, a first action contingent on timer expiry is for the initiator to use a NOP command (or similar verification utility such as a ping utility) to determine whether the server has failed or there is a path failure. If the server is able to respond, the delay receiving a response to the previous request is due to some other factor such as a failure of the specific device handling the I/O request. Failover recovery by a peer server is initiated if the failure type appears to be recoverable by the peer server—such as in the case of an apparent server or path failure.

Subject to the possible checks described above, a timer expiry is followed by the initiator commencing a failover recovery operation. The initiator closes socket connections to the primary server, closing the failed iSCSI session. The initiator accesses the previously stored identification of the secondary target server and connects 260 to the secondary server—requesting a normal iSCSI communication session—in order to continue data access operations.

The initiator then instructs the secondary server to perform 270 a reset of any resources such as storage devices reserved by the failed primary server for that initiator. The Reset instruction is generated by reference to a data structure maintained by the initiator that records all of the initiator's current device reservations, and the Reset instruction is implemented as a Logical Unit Reset operation sent in an iSCSI Task Management Request. The reset of the reserved storage device or other resource effectively cancels any reservations held for those resources. The initiator must then instruct the secondary server to obtain 280 a reservation of the storage device or other required resource. The new reservation is obtained using the same Reserve request mechanism as the initial reservation.

In some embodiments of the invention, there exists a small window of time between the Reset operation that releases an initial reservation and the Reserve operation that obtains a new reservation for the same initiator. The original initiator may discover that the new Reserve request is denied because a different initiator has obtained a reservation of the required resource. In some embodiments, the original initiator may simply wait until the different initiator releases the new reservation and then obtain a reservation itself.

In other embodiments, the first initiator is able to repeatedly issue Reset and Reserve operation requests until both succeed together. This reset may release a reservation obtained by a different initiator. In another embodiment, operations for releasing reservations and a new Reserve operation are managed within the scope of a single transaction such that the release operation is not committed until after the new reservation is being processed, and this avoids other initiator's reserving the resource.

The above-described connection to a previously identified backup server, in response to specific trigger conditions indicating that a failure has affected the primary server, avoids the need to continuously perform a heartbeat operation. The new target server is one of a set of servers to which the initiator can connect (either simultaneously or consecutively), which servers manage access to required resources. The new target server takes over the responsibilities of the primary server for future operations on the same resource instance that was operated on by the primary server before it failed—without having to take over the IP address of the failed target server. The invention is applicable to iSCSI and other network environments in which multiple servers control client access to a particular set of resources, without interfering with each other and without replicating the resources across the servers. Non-iSCSI storage networks are examples of such environments. The release of existing reservations using a reset operation, and re-reservation by the original initiator via a backup server, deals with any dangling reservations.

Figure 4:
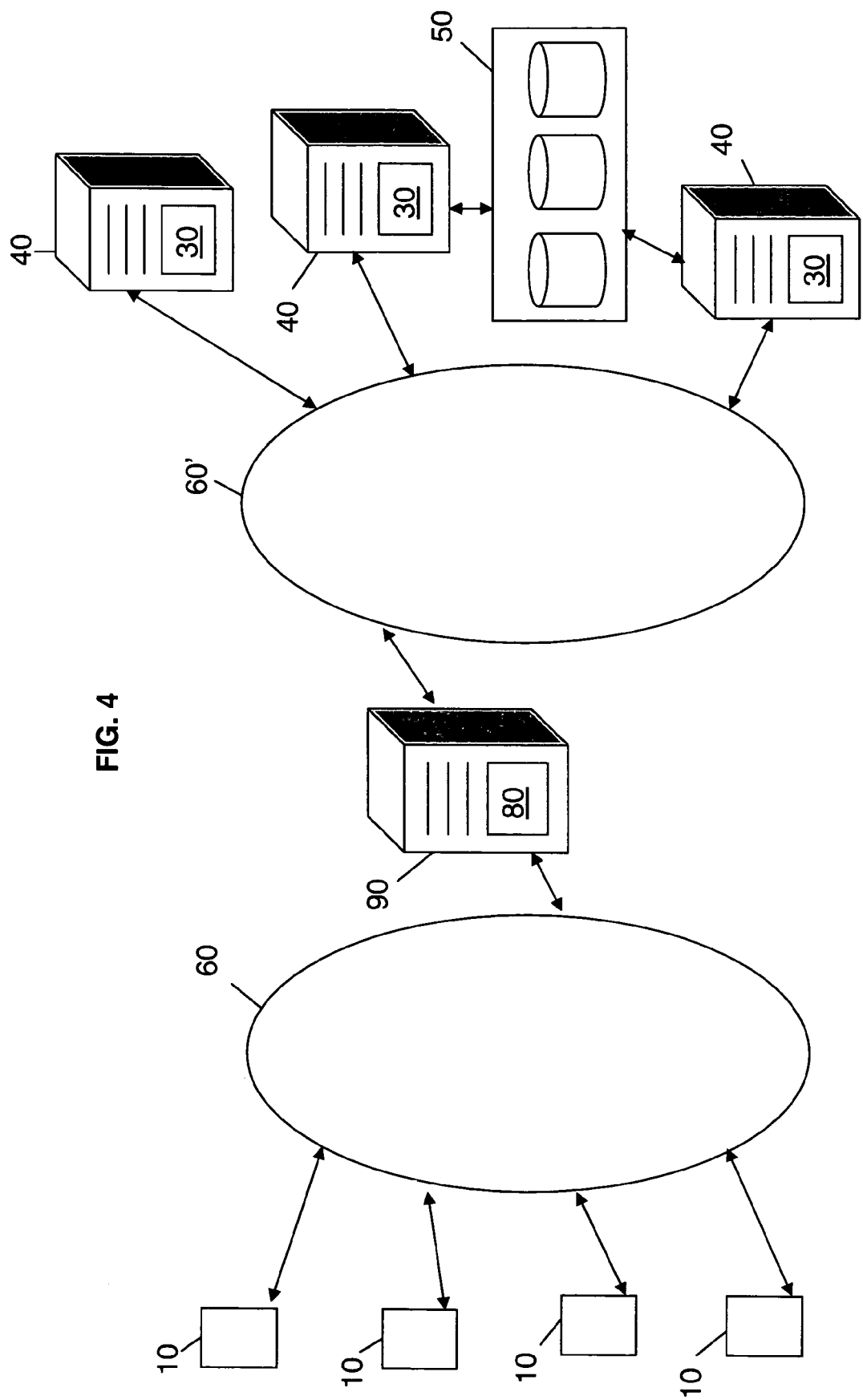
FIG. 4 is a schematic representation of a network in which a number of client computer systems connect to an iSCSI gateway via a front-end IP network, and the gateway connects to a set of iSCSI servers and connected storage devices via a backend IP network.

FIG. 4 shows an example network in which a number of client computer systems 10 running ISCSI initiators connect, via a front-end IP network 60, to an iSCSI gateway 80 running on a network-connected computer system 90. The gateway 80 connects, via a backend IP network 60', to a set of iSCSI targets 30 running on server computers 40. The iSCSI targets 30 control access to connected storage devices 50. In such a network, the iSCSI initiators may perform the steps for failover recovery as described above, and the gateway may be an intermediate network connection point providing access to iSCSI storage controllers and routing functions but not significantly altering the failover recovery operations of initiators and targets. Alternatively, the iSCSI gateway may function as a discovery server—with the initiator 20 at a client system 10 initially being configured to only know the identity of the gateway 80. An initiator 20 opens a discovery-type session with the gateway 80. The gateway 80 returns a list of targets 30 that sit behind the gateway and to which any initiator may connect. The gateway may then act as a router (and/or firewall).

In another alternative embodiment of the invention, the iSCSI gateway 80 is a service requestor that is provided with an identification of the primary and secondary servers, and the gateway stores this identification to enable connection to the primary server and to enable failover recovery. In response to a failure resulting in inability of the primary server to access a required resource instance, the gateway retrieves the identification of a secondary server from storage and establishes communications with the identified secondary server to access the resource instance.

What is claimed is:

1. A method for failover recovery, comprising:
receiving an identification at an initiating computer of a primary server and, independently of any failure of the primary server, of a backup server for providing access to a data storage resource;
responsively to the identification, submitting a first request from an initiating computer to the primary server to reserve the data storage resource, while maintaining a record of a reservation of the data storage resource at the initiating computer;
after submitting the first request, detecting a failure of the primary server;
responsively to detecting the failure, submitting a second request from the initiating computer to the backup server, responsively to the record, to reset the data storage resource on which the reservation was made; and
after resetting the data storage resource, accessing the data storage resource via the backup server.

2. The method according to claim 1, wherein accessing the data storage resource comprises submitting a third request to the backup server to place a new reservation on the data storage resource, and accessing the data storage resource via the backup server using the new reservation.

3. The method according to claim 1, wherein the data storage resource is a data storage device.

4. The method according to claim 3, wherein the primary and backup servers comprise storage access controllers within a storage area network (SAN).

5. The method according to claim 3, and comprising sending a reset instruction, by reference to the record maintained by the initiating computer, from the backup server to the data storage device on which the reservation was made.

6. The method according to claim 5, wherein the reset instructions is implemented as a Logical Unit Reset operation sent in an iSCSI Task management Request from the backup server to the data storage device.

7. The method according to claim 1, wherein the primary and backup servers comprise iSCSI target servers.

8. The method according to claim 1, wherein the initiating computer is an iSCSI initiator.

9. The method according to claim 1, wherein the initiating computer is an iSCSI gateway.

10. The method according to claim 1, wherein detecting the failure comprises waiting to receive a response from the primary server for a preset time period after submitting the first request, and identifying the failure when the time period expires prior to receipt of the response.

11. The method according to claim 10, wherein detecting the failure comprises, upon identifying the failure, verifying that the primary server is unavailable before submitting the second request.

12. The method according to claim 1, wherein receiving the identification of the primary server and the backup server comprises requesting discovery of a server, within a set of servers, that is available to provide access to the data storage resource, and initiating a discovery operation by one of the servers in the set in order to identify at least one of the primary server and the backup server.

13. The method according to claim 12, wherein the discovery operation is performed by an iSNS server.

14. The method according to claim 12, wherein requesting the discovery comprises sending a Service Level Protocol request as a multicast to the servers in the set.

15. The method according to claim 1, wherein resetting the data storage resource comprises removing dangling reservations from the data storage resource.

* * * * *